US006991425B2

(12) United States Patent
Kruegel et al.

(10) Patent No.: US 6,991,425 B2
(45) Date of Patent: Jan. 31, 2006

(54) AIR TURBINE STARTER WITH UNITARY INLET AND STATOR

(75) Inventors: Roy F. Kruegel, Laveen, AZ (US);
Cynthia S. Byers, Mesa, AZ (US);
Gary E. Armstrong, Mesa, AZ (US);
Todd A. Langston, Chandler, AZ (US);
Marvin K. Collins, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 21 days.

(21) Appl. No.: 10/661,312

(22) Filed: Sep. 12, 2003

(65) Prior Publication Data

US 2005/0058542 A1    Mar. 17, 2005

(51) Int. Cl.
 *F01D 15/12*    (2006.01)
(52) U.S. Cl. ............... 415/122.1; 415/213.1; 415/214.1; 415/200; 29/889.2
(58) Field of Classification Search ........... 415/191, 415/189, 194, 195, 213.1, 214.1, 221, 200, 415/208.2, 122.1, 209.2; 60/787–789; 29/889.2
See application file for complete search history.

(56) References Cited

U.S. PATENT DOCUMENTS

| | | | |
|---|---|---|---|
| 2,635,047 A | | 1/1953 | Wood |
| 2,661,493 A | | 9/1953 | Volk |
| 2,775,894 A | | 1/1957 | Troeger et al. |
| 3,006,603 A | * | 10/1961 | Caruso et al. ............... 415/195 |
| 3,802,046 A | | 4/1974 | Wachtell et al. |
| 3,970,538 A | | 7/1976 | Lucas |
| 3,989,407 A | * | 11/1976 | Cunningham .................. 415/1 |
| 4,159,407 A | | 6/1979 | Wilkinson et al. |
| 4,565,490 A | * | 1/1986 | Rice ........................... 415/114 |
| 4,995,949 A | | 2/1991 | Rhoades |
| 5,042,963 A | * | 8/1991 | Sorenson et al. ............. 60/787 |
| 5,248,386 A | | 9/1993 | Dastolfo, Jr. et al. |
| 5,257,685 A | * | 11/1993 | Tichiaz et al. ................ 192/46 |
| 5,267,433 A | * | 12/1993 | Burch .......................... 60/788 |
| 6,318,958 B1 | * | 11/2001 | Giesler et al. .............. 415/230 |
| 6,321,448 B1 | | 11/2001 | Makino et al. |
| 6,585,483 B2 | * | 7/2003 | Feest ....................... 415/216.1 |
| 6,681,579 B2 | * | 1/2004 | Lane et al. .................... 60/787 |
| 2003/0161721 A1 | | 8/2003 | Farnsworth et al. |

FOREIGN PATENT DOCUMENTS

| | | |
|---|---|---|
| EP | 1 382 817 A | 1/2004 |
| GB | 670 309 A | 4/1952 |
| JP | 11 2008 08 | 7/1999 |
| WO | PCT/US2004/029412 | 5/2005 |

* cited by examiner

*Primary Examiner*—Edward K. Look
*Assistant Examiner*—Igor Kershteyn
(74) *Attorney, Agent, or Firm*—Ingrassia Fisher & Lorenz (57) ABSTRACT

An air turbine starter for use in aircraft or other gas turbine engine applications. In a particular embodiment, the air turbine starter has a titanium unitary inlet structure. The unitary inlet structure has a housing having a longitudinal centerline. The housing defines an air inlet, a mounting surface, and a flow path therebetween. Integrally formed inside the housing and transverse to the longitudinal centerline is a stator for directing the flow of air in to the turbine blades of the turbine starter. The stator has a central circular body with a plurality of angularly spaced circumferentially mounted stator fins. An improved unitary inlet structure and method for making such a unitary inlet and stator are also provided.

31 Claims, 6 Drawing Sheets

AIR TURBINE STARTER WITH UNITARY INLET AND STATOR

FIELD OF THE INVENTION

This invention relates generally to air turbine starters for gas turbine engines, and, in particular, to the air turbine stator inlet assembly used in such starters.

BACKGROUND OF THE INVENTION

An air turbine starter is a device used to start a turbine engine, such as a gas turbine jet engine commonly found on aircraft. The air turbine starter is connected to the jet engine and is used to start the jet engine in generally the same way as a starter for an automobile is used to start the automobile's engine. The developer of the present inventions, Honeywell International, Inc., has for years successfully designed, developed, manufactured and repaired air turbine starters.

Figure 1A:
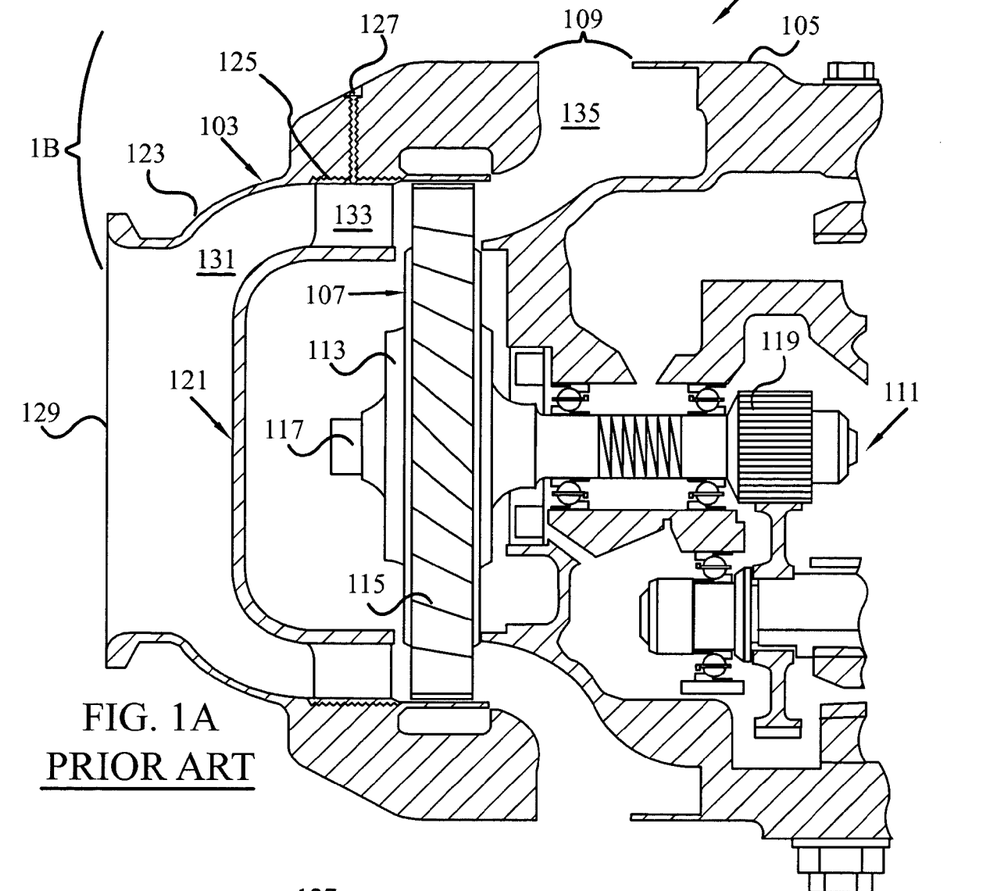
FIG. 1A is a partial cross-sectional view of a prior art turbine starter with a two-piece stator inlet assembly.

FIG. 1 shows a partial cut-away diagram of a conventional air turbine starter 100, which includes an air inlet assembly 103 that is joined to a main housing 105. Maintained within the main housing 100 are airways and other components such as a turbine assembly 107, an air outlet 109, and a gearbox 111 which is coupled to an output shaft (not shown). The turbine assembly 107 has a turbine wheel 113 with circumferentially mounted blades 115, a rotatable drive shaft 117 and a gear 119. The air inlet assembly 103 is made up of two primary components, a stator 121 and an outer shell 123. In many instances the stator 121 and outer shell 123 provide mating threads 125. In some cases a locking pin 127 may additionally be used to assist in keeping the stator 121 and outer shell 123 together. Additional turbine starter features are disclosed in Honeywell's U.S. Pat. No. 6,318,958 (Giesler et al.) and U.S. Pat. No. 4,914,906 (Burch) which are incorporated by reference herein.

In order to start a jet engine the air turbine starter 100 is first activated. Generally speaking, such activation is accomplished by connecting an air pressure duct to an air inlet 129 provided by the stator 121 portion of the inlet assembly 103. Compressed air is directed by contoured passage 131 through stator fins 133, across the turbine blades 115 and is vented from air outlets 109. In operation, the energy of the moving air is converted by the blades 115 into rotary motion, causing the turbine assembly 107 to rotate.

Generally, the turbine starter 100 is joined to the jet turbine engine such that it travels with the jet. As a result, the weight of the turbine starter 100 is generally a calculated component of the overall weight of the aircraft and as such, reduces the total amount of cargo weight that the jet may transport. In the commercial aircraft industry, each additional pound of weight may cost the aircraft manufacturer a financial penalty. Likewise each additional savings of a pound may be credited to the manufacturer as a financial savings.

As noted above, the inlet assembly 103 is comprised of two components, namely the stator 121 and outer shell 123. The function of the stator fins 133 is to direct the supplied compressed air across the turbine blades. The narrowing passageways between the stator fins 133 act as nozzles to increase the velocity of the air as it strikes the rotating turbine blades 115. Given the velocity and pressure of the compressed air, it is generally desirable to align the direction of the air flow to the turbine blades 115 so as to reduce stress and wear upon the turbine assembly. The outer shell 123 generally aligns the stator fins 133 to the turbine blades 115 and provides the outer portion of the contoured passage 135 leading to the air outlets 109.

The manufacture of the air inlet assembly 103 is typically an involved tooling process given the nature of the air inlet 129, the contoured passage 131, and configuration of the stator fins 133. As the name suggests, the stator 121 and the stator fins 133 do not rotate. Typically the outer shell 123 may be fabricated as a single piece from a titanium alloy, desired for it's strength and relative light weight as well as other characteristics.

Manufacture of the stator 121 as a single item from a titanium alloy has heretofore not been achievable. The contours, airfoil shapes and limited spaces have frustrated attempts to produce simply the stator 121, let alone the outer shell 123 and stator 121 as a single contiguous item. As a result, the stator 121 is generally manufactured from a heavier, but easier to tool alloy such as an inconel alloy. Several machining steps may be needed to join the stator 121 to the outer shell 123, each step potentially resulting in additional training, equipment, cost, and time, as well as potentially different geographic locations of each step of fabrication—a factor adding yet further cost for time and shipping. In addition, the outer shell 123 may be flared out or fabricated with additional sidewall thickness in the area accommodating the mating threads 121. As such, the inlet assembly 103 weight as thickened may be greater than what could be achieved with a unitary inlet assembly. Further, as the outer shell 123 and stator 121 are fabricated from different metal alloys, the different relative hardness and thermal expansion and contraction properties may frustrate the threaded union and accelerate wear between the components.

Figure 1B:
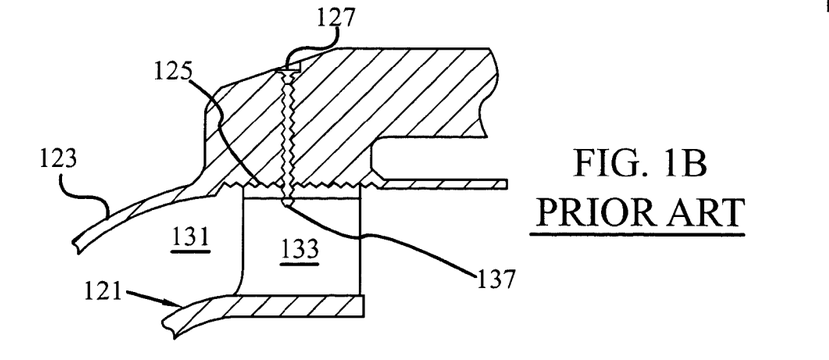
FIG. 1B is an enlarged cross-sectional view of the threaded attachment of the prior art assembly shown in FIG. 1A.

Wear of the stator fins 133 and turbine blades 115 is understood to be a natural result of starter operation. In certain instances, internal vibration and or dynamic responses of the turbine blades may result in fracturing of the turbine blades 115, also known as mouse bites. The occurrence of occasional mouse bites to the turbine blades 115 may decrease operational performance, cause internal damage, and/or accelerate the need for maintenance. The common practice of setting the joined stator 121 and outer shell 123 with a locking pin 127 has been found to occasionally fail. Operational vibration of the aircraft, thermal expansion and contraction, and or perhaps even installation error may introduce the end 137 of the locking pin 127 into the contoured passage 131, an event that may or may not affect the performance of the starter. Should the locking pin 127 come loose during operation and entirely enter the passage 131, passage of the pin 127 through the stator fins 133 and or the turbine blades 115 may cause significant damage to these components and affect the overall function and performance of the turbine starter and may necessitate a more extensive rebuild of the turbine starter 100.

However, it should be appreciated that despite the drawback of mouse bites and the potential failure of the locking pin 127, air turbine starters are generally operationally safe and reliable. Inspections of the air inlet 129 and stator 121 are generally part of the routine maintenance schedules set for the turbine starter 100.

Hence, there is a need in for an improved air turbine starter having an inlet and stator with improved characteristics to overcome one or more of the drawbacks identified above. The present invention satisfies one or more of these needs.

SUMMARY OF THE INVENTION

The invention provides an air turbine starter with an improved unitary inlet structure for gas turbine applications, and an associated improved unitary inlet structure.

In particular, and by way of example only, one embodiment of the present invention provides an air turbine starter having a main housing, a turbine assembly partially disposed within the main housing and a unitary inlet structure. The turbine assembly includes a turbine wheel having a plurality of circumferentially mounted blades. The unitary inlet structure is coupled to the main housing and substantially encloses at least a portion of the turbine wheel. The unitary inlet structure is characterized by a housing section having at least an inlet, an inner surface, and a mounting surface. A stator section is disposed at least partially within the housing section and has an outer surface. At least a portion of the housing section inner surface and at least a portion of the stator section outer surface form a flow path that fluidly couples the housing section air inlet to the turbine blades.

Moreover, according to an embodiment thereof, the invention provides an air turbine starter unitary inlet structure. The unitary inlet structure is characterized by an annular housing having a longitudinal centerline. The housing defines an air inlet, an inner surface and a mounting surface. An annular air director is provided integrally formed as part of the annular housing, the annular air director disposed at least partially within the annular housing and having an outer surface. At least a portion of the annular housing inner surface and the air director outer surface form a flow path that extends substantially parallel to the longitudinal centerline.

In yet another embodiment, the invention may provide a titanium air turbine starter unitary inlet structure. The titanium unitary inlet structure is characterized by a housing having a longitudinal centerline, an air inlet, an inner surface, a mounting surface, the annular housing defining a flow path between the air inlet and the mounting surface. A stator is integrally formed as part of the housing. The stator is disposed at least partially within the housing between the inlet and mounting surface and substantially transverse to the longitudinal centerline.

In optional details, the stator may be further characterized by a central circular body with a plurality of angularly spaced circumferentially mounted stator fins. The stator fins may be also be asymmetrically spaced.

In still another embodiment, the invention provides a method of manufacturing a titanium air turbine starter unitary inlet structure. The method includes casting a unitary inlet structure from an alloy. The cast unitary inlet structure is initially characterized by an oversized annular housing having a longitudinal centerline, at least an air inlet and a mounting surface. An oversized stator integrally formed as part of the oversized annular housing. The oversized stator is disposed at least partially within the housing and has a plurality of angularly spaced, circumferentially mounted oversized stator fins connecting the stator to the annular housing. The oversized housing and stator are chemically milled to remove alloy from the oversized surfaces. The clearance between the chemically milled stator fins is measures and compared to one or more predetermined values. The chemical milling and measuring steps are repeated until at least the measured clearance between the chemically milled stator fins is substantially equal to one or more predetermined values.

These and other features and advantages of the preferred apparatus and method will become apparent from the following detailed description taken in conjunction with the accompanying drawings which illustrate, by way of example the principles of the invention.

DETAILED DESCRIPTION

Before proceeding with the detailed description, it is to be appreciated that the present invention is not limited to use or application with a specific type of air turbine starter. Thus, although the present invention is, for the convenience of explanation, depicted and described with respect to one type of unitary air turbine stator inlet as may be used in connection with a gas turbine engine, this invention may be applied to other types and styles of air turbine starters used in other turbine engine applications.

Figure 2:
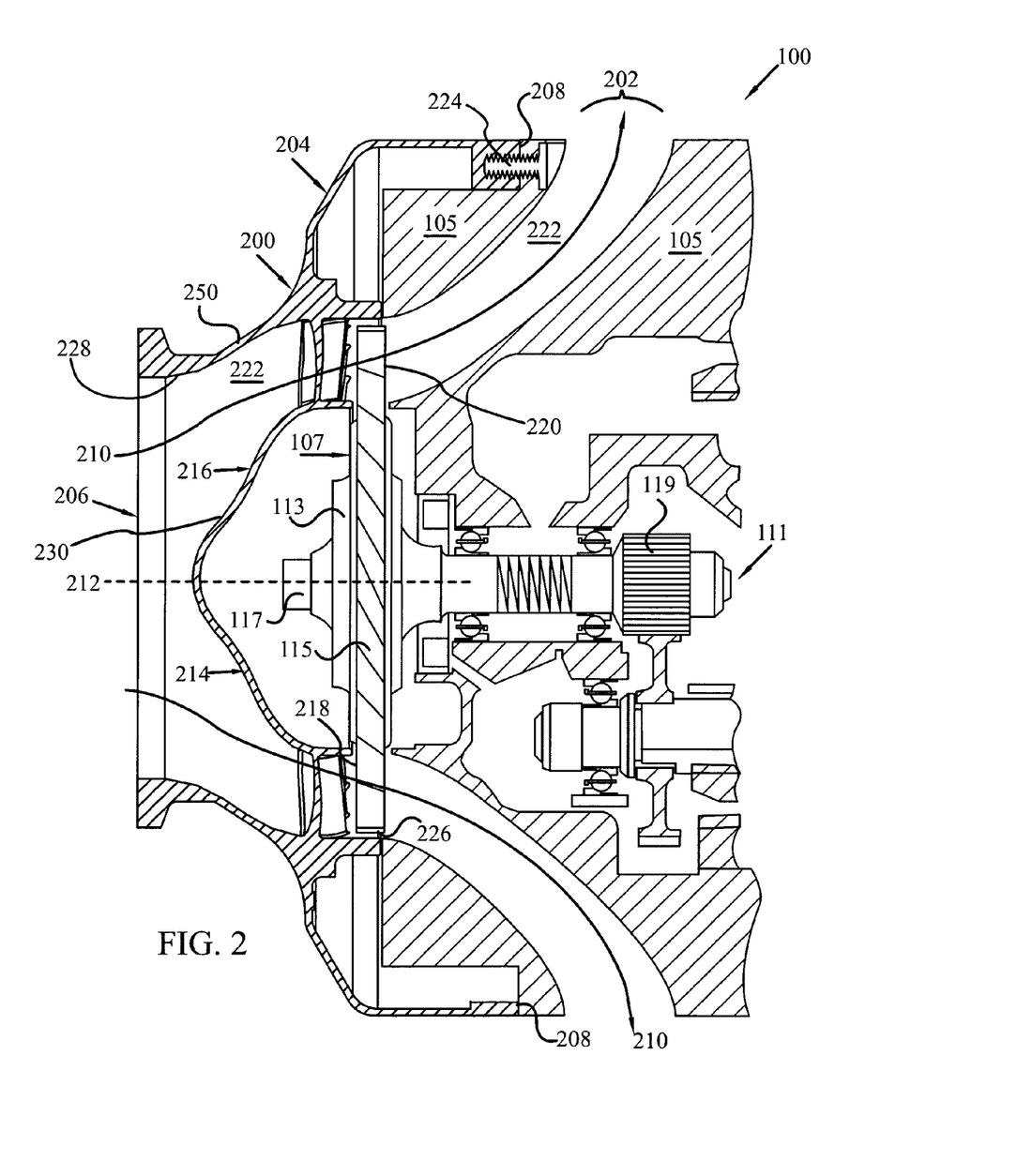
FIG. 2 is a partial cross-sectional view of a an air turbine starter with a the unitary inlet structure according to an embodiment of the present invention.

A partial cut-away view of an exemplary air turbine starter 100 employing an embodiment of the present invention is shown in FIG. 2. As shown herein, air turbine starter 100 includes a main housing 105, a gearbox 111 a turbine assembly 107, a unitary inlet structure 200, and at least one air outlet vent 202. The gearbox 111 is coupled to an output shaft (not shown), which is in turn coupled to, for example, a turbofan jet engine. The turbine assembly 107 includes a turbine wheel 113 with circumferentially mounted blades 115 and a rotatable drive shaft 117 that extends into the main housing 105 and is joined to gear 119 and gearbox 111.

The unitary inlet and stator, more simply identified as the unitary inlet structure 200 includes a housing section 204 with an interior surface 228 defining an air inlet 206, a mounting surface 208, and a flow path (represented by arrows 210) for conveying a flow of air therebetween. In at least one embodiment the housing 204 is an annular housing about a longitudinal centerline 212. The longitudinal centerline 212 may substantially match to the longitudinal centerline of the drive shaft 117. An annular air director 214, such as a stator 216 is integrally formed as part of housing 204 proximate to the inlet 206. More specifically the air director 214 is disposed at least partially within the housing 204, substantially transverse to the flow path 210 and concentric to the longitudinal centerline 212. The stator 216 has an outer surface 230 that, along with the inner surface 228 of the housing 204, further forms and defines flow path 210. More specifically, at least a portion of the inner surface 288 of the housing 204 and a portion of the outer surface 230 of the stator 216 fluidly couple the air inlet 206 to the turbine blades 115.

The mounting surface 208 is shaped and sized to join the unitary inlet structure 200 to the main housing 105, such that the stator 216 is positioned proximate to the upstream side 218 of turbine wheel 113 In addition, the turbine wheel 113 is substantially enclosed by the unitary inlet structure 200. The outlets 202 are located proximate to the downstream side 220 of the turbine wheel. Under appropriate circumstances, outlets 202 may be provided as part of the unitary inlet structure 200 housing 204 rather than the main housing 150 of the starter 100. As conceptually illustrated, the unitary inlet structure 200 and main housing 105 define a flow path through passage 222. Compressed air entering the inlet 206 is channeled by passage 222 through the stator 216, through the blades 115 of the turbine wheel 113, and to the outlet 202.

Figure 3A:
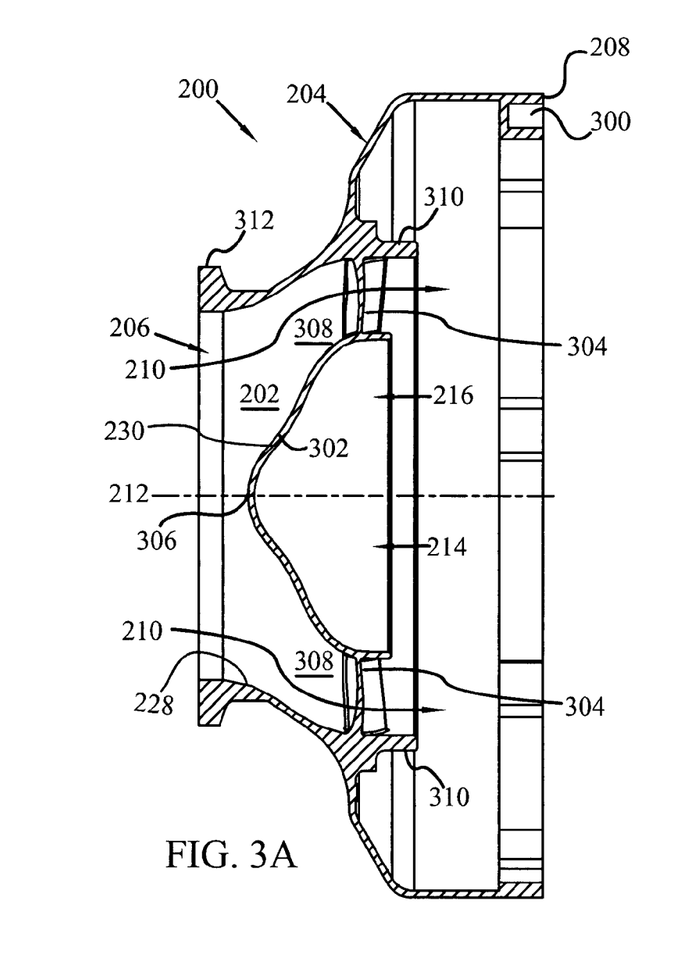
FIG. 3A is a half cutaway of the unitary inlet structure shown in FIG. 2.

The joining of the unitary inlet structure 200 to the main housing 105 may be accomplished by the any one of numerous forms of attachers such as, for example a threaded screw sockets 300 (see FIG. 3), set to receive bolts 224 extending from the main housing 105. Under appropriate circumstances, other suitable alternative joining methods may be employed. Generally, attaching bolts 224 and outlet vents 202 alternate in their placement about the exterior of the main housing 105. Under appropriate circumstances a bolt 224 may pass through a portion of the outlet 202, or the outlet 202 may provide access to the attaching bolt 224.

Figure 6:
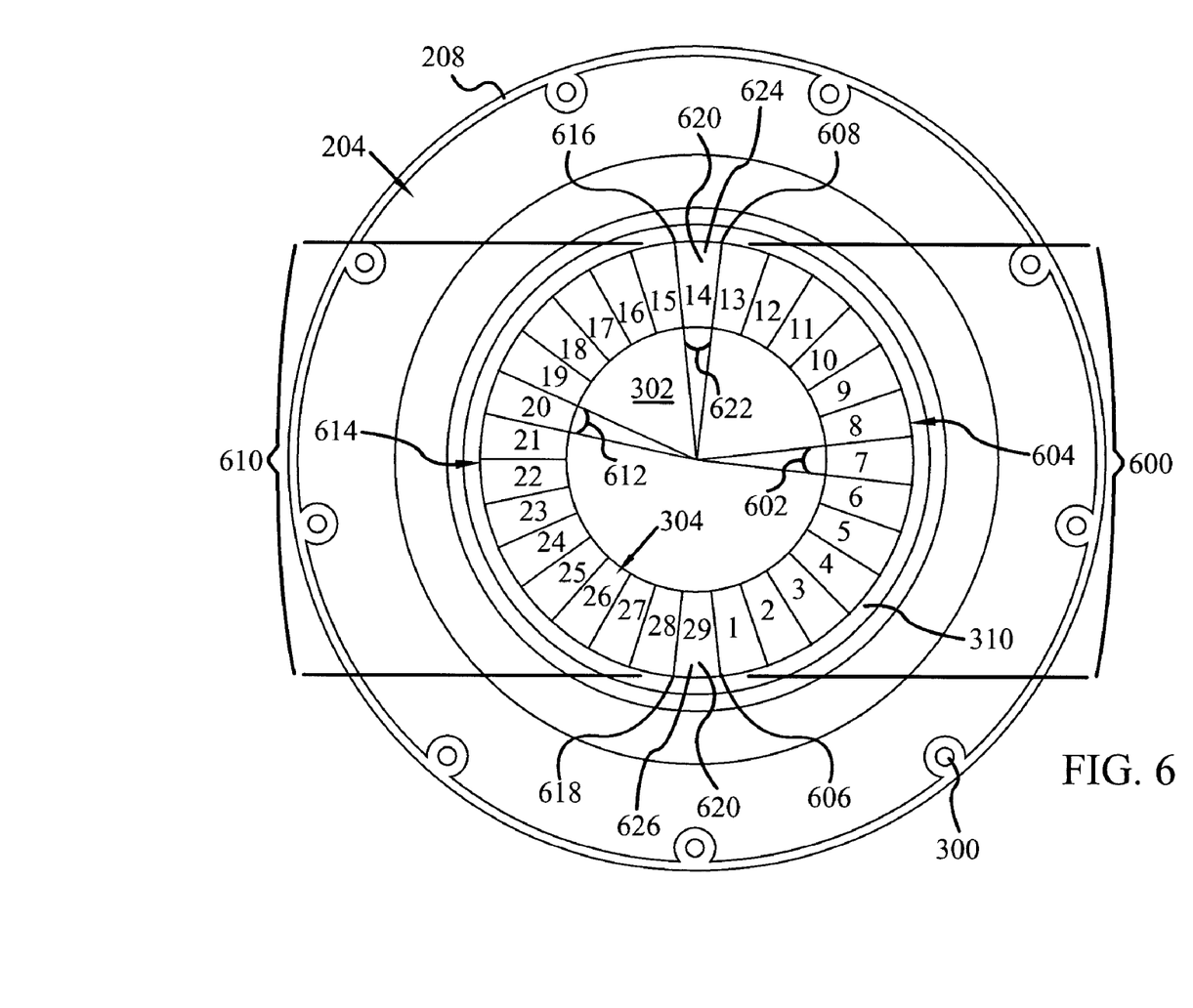
FIG. 6 is an interior view of the unitary inlet structure shown in FIG. 5.

The advantages of the unitary inlet structure 200 may be further appreciated with respect to the views provided in FIGS. 3 through 6. The perspective view of FIG. 4, along with the exterior view of FIG. 5 and interior view of FIG. 6 are provided to complement FIGS. 3A and 3B. As indicated in the cutaway depictions of FIGS. 3A and 3B, the housing 204 and stator 216 are advantageously formed as a unified whole. There are no threads, welds or other forms of attachment joining separately formed components as in the prior art. Indeed, the term "unitary" as used herein with respect to the unitary inlet structure 200 is understood and appreciated to define the structure as an undivided whole, and not one assembled from a collection of separately manufactured parts. As is described in greater detail below, the unitary inlet structure 200 is preferably manufactured from a titanium alloy.

Figure 3B:
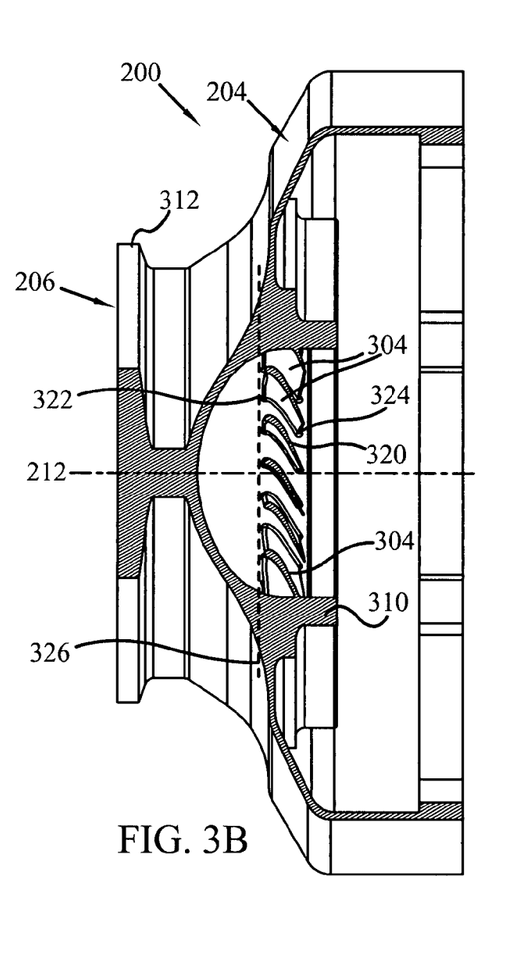
FIG. 3B is a partial cutaway of the unitary inlet structure shown in FIG. 2.
Figure 4:
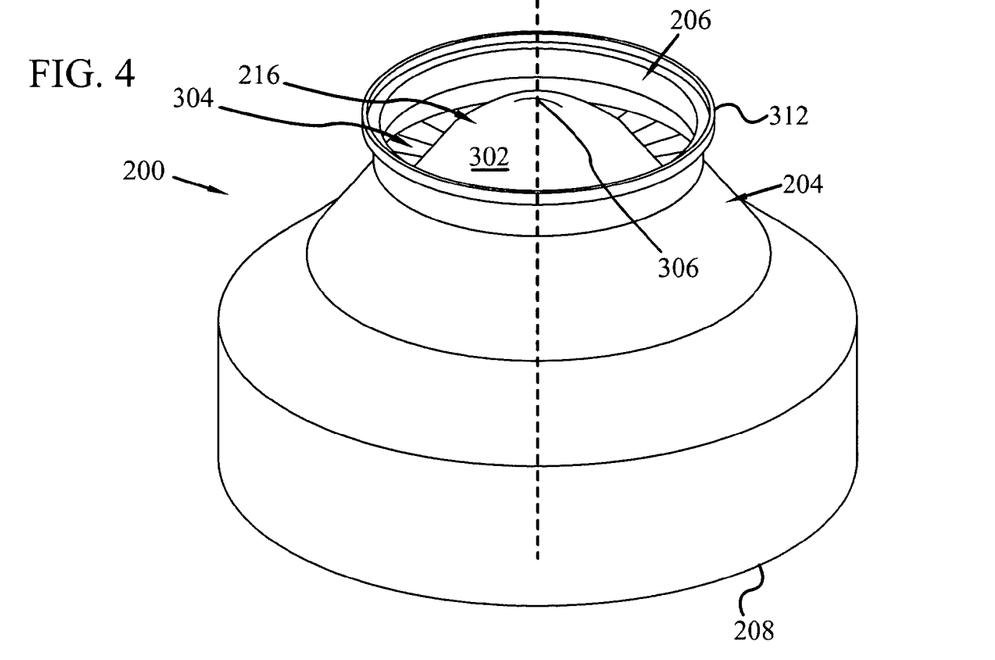
FIG. 4 is a perspective view of the unitary inlet structure shown in FIGS. 3A and 3B.
Figure 5:
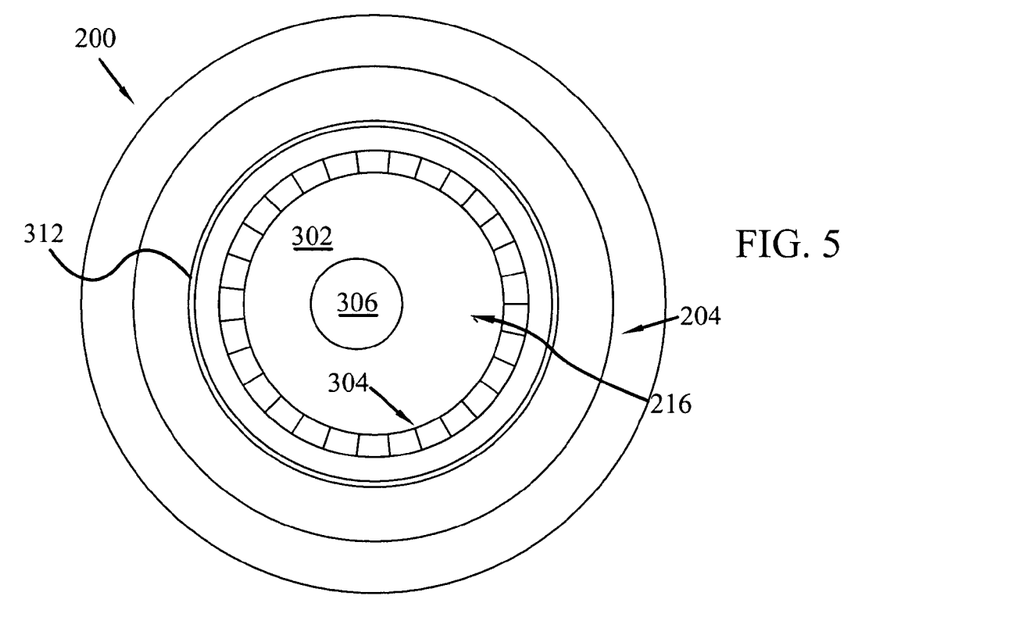
FIG. 5 is an exterior view of the unitary inlet structure shown in FIG. 4.

In at least one embodiment, the stator 216 is characterized by a central circular body 302 with a plurality of angularly spaced circumferentially mounted blades, commonly referred to as stator fins 304, stator blades or stator veins. As shown, the stator fins 304 may exist at about the midpoint between the air inlet 206 and the mounting surface 208. In at least one embodiment the stator fins 304 are substantially identical.

The central body 302 may be described as somewhat parabolic in shape such that the center-point 306 is extended towards the air inlet 206. More specifically, the central body 302 serves to assist in defining the flow path 210, directing the supplied compressed air into the stator fins 304. As shown in FIG. 3A, as the surface of the central body 302 expands from the center-point 306 to the stator fins 304, the defined passage 308 (the first part of flow path 202 shown in FIG. 2) narrows. This narrowing of the passage 308 serves to further compress and increase the air velocity as it is directed into the stator fins 304.

To assist and insure proper flow of the directed air through the turbine blades 115, the stator 216 may additionally include an outer ring 310. When the unitary inlet structure 200 is mounted to the main housing 105, the outer ring 310 may encompass at least a portion of the distal edges 226 the turbine blades 115 (see FIG. 2). Improper placement of the stator 216 relative to the turbine blades 115 may result in inappropriate air flow between the stator and the turbine and correspondingly lower the turbine starter 100 performance.

As the prior art assembly requires the stator 121 and outer shell 123 to be joined, such as by mated threading 125, substantially exact placement of the stator 121 relative to the turbine blades 115 may not be consistently achieved. Tooling issues in the threading process may result in the stator 121 being either too close or too removed from the turbine blades 115. An advantageous result of the unitary construction herein disclosed, is the substantially exact and consistent placement of the stator 216 relative to the turbine blades 115 when the unitary inlet structure 200 is attached to the main housing 105.

To further enhance the velocity of the air as it drives through the turbine blades 115, the stator fins 304 may have a cross-sectional shape of an air-foil 320 (see FIG. 3B). In general, the leading edge 322 of each stator fin exists in a common plain 326 transverse to the longitudinal centerline 212. In a similar fashion, the trailing edge 324 of each stator fin exists in a common plain parallel to the plain defined by the plurality of leading edges 322.

During operation of the air turbine starter, compressed air is supplied to the air inlet 206, generally with the use of a flexible hose. To assist with the attachment of a hose, the unitary inlet structure 200 may include a flanged skirt 312 or other suitable structure to which a supply hose may readily be attached. The non-moving, rigidly mounted stator fins 304 serve in part to shelter the turbine assembly 107 from the direct brunt of the potentially non-uniform thrust force provided by the compressed air as it exits the supply hose and enters the air inlet 206. The compressed air is directed by the passage 308 to arrive at the stator fins 304 with an alignment of flow that is substantially parallel to the longitudinal centerline 212. Relative to this flow of oncoming air, the stator fins 304 are oriented with an angle of attack to uniformly align the flow of air for delivery into the turbine blades 115. It is understood and appreciated that an angle of attack of an, such as one of the turbine blades 115, is the angle at which the relative wind meets the airfoil. In at least one embodiment, the angle of attack is about 36.738 degrees. Further, in at least one embodiment the angular spacing of the stator fins 304 may be symmetric.

As noted above, prior art turbine starters have been found to experience occasional mouse bites to the turbine blades 115. According to at least one embodiment of the present invention, the harmonics created by the air passing from the stator 216 through the turbine blades 115 which create the environment for mouse bites to occur may be substantially prevented. Specifically, according to at least one embodiment of the present invention, the angular spacing of the stator fins 304 is asymmetric. The asymmetric spacing of the stator fins 304 induces different portions of the stator 216 to deliver air to the turbine blades 115 slightly differently. As an engineer might generalize to a layperson, the turbine wheel is fooled during it's rotations—at one moment in the revolution the blades 115 receive air from a stator 216 appearing to have one number of stator fins 304, and at the next moment appearing to have a different number of stator fins 340. Such differences in air delivery are sufficient to disrupt and/or otherwise prevent the formation of potentially harmful harmonic frequencies in the turbine blades 115.

The asymmetric angular spacing of the stator fins 304 may be more fully appreciated with reference to FIG. 6. The stator fins 304 may be subdivided into at least three groups. The first group 600 of stator fins 304 may be characterized by substantially equal angular spacing 602 for about the total number of overall stator fins plus at least one, the spaced arrangement forming a first arc 604 having a first end 606 and a second end 608.

The second group 610 of stator fins 304 may be characterize by substantially equal angular spacing 612 for about the total number of overall stator fins minus at least one, the spaced arrangement forming a second arc 614 having a first end 616 and a second end 618. A transition group 620 characterized by an even number of stator fins 304 substantially equal in angular spacing 622 for about the total number of stator fins 304. The transition group 620 serves to transition the spacing from the first group 600 to the second group 610, and from the second group 610 back to the first group 600. More specifically, in at least one embodiment one half of the transition group 620, for example stator fin 624, is placed between the second end 608 of the first arc 604 and the first end 616 of the second arc 614. In similar fashion, the second half of the transition group 620, for example stator fin 626, is placed between the second end 618 of the second arc 614 and the first end 606 of the first arc 604. This arrangement of the first group 600, second group 610 and transition group 620 substantially forms a circle.

As shown, in at least one embodiment the stator 216 comprises 29 stator fins 304. In addition, in at least one embodiment the number of stator fins 304 in each of the above described groups may be as follows; the first group 600 consisting of 14; the second group consisting of 13; and the transition group consisting of 2. The angular spacing 602 of the fins of the first group 600 (stator fins 304 1 through 14) is about 12.0000 degrees. The angular spacing 612 of the fins of the second group 608 (stator fins 304 16 through 28) is about 12.8571 degrees. The angular spacing 622 of the transition group 622 (stator fins 304 15 and 29) is about 12.4286 degrees.

As used herein, the term angular spacing is to be understood and appreciated to imply angular increments about the circumference of a circle. For example, placing 12 points at the angular spacing of 30 degrees along the circumference of a circle will provide the hour marks as are commonly seen on traditional non-digital clocks. Moreover, as measured from a consistent point, one stator fin to the next (leading edge 322, trailing edge 324 or other reference point), if stator fin A' is to be angularly spaced 12.0000 degrees from stator fin A, the leading edge 322 of stator fin A' will be 12.0000 degrees from the leading edge 322 of stator fin A.

In addition to the precise placement of the stator 216 relative to the turbine blades 115 as discussed above, the unitary inlet structure 200 provides numerous additional benefits. Manufacturing costs and time may be reduced by eliminating the additional tooling required to thread the stator and housing components so that they may be joined. In addition, the use of a locking pin or other setting device that may inadvertently come loose and cause internal damage to the air turbine starter 100 is eliminated. Further, inventory, tracking, and purchase order issues are simplified as a natural result from the reduction in component pieces.

The preferred embodiments of the unitary inlet structure 200 are preferably achieved with a titanium unitary inlet structure 200. More specifically, fabrication of the unitary inlet structure 200 may by achieved with the use of a titanium alloy, such as a general purpose titanium alloy as is traditionally used in the aircraft industry for parts requiring a good strength-to-weight ratio and corrosion resistance.

In at least one embodiment, the titanium alloy commonly known and identified as Ti6Al4V may be used. The unitary inlet structure 200 as fabricated from the titanium alloy may be significantly lighter than prior art stator and inlet assemblies wherein the housing is fabricated in titanium alloy, but the stator is fabricated from a heavier alloy such as a common inconel alloy. In at least one embodiment the unitary inlet structure 200 may be about 0.5 pounds lighter than conventional prior art inlet and stator assemblies, an achievement that may translate to a savings of about $500 per takeoff to the aircraft operator.

Figures 7A, 7B, 7C:
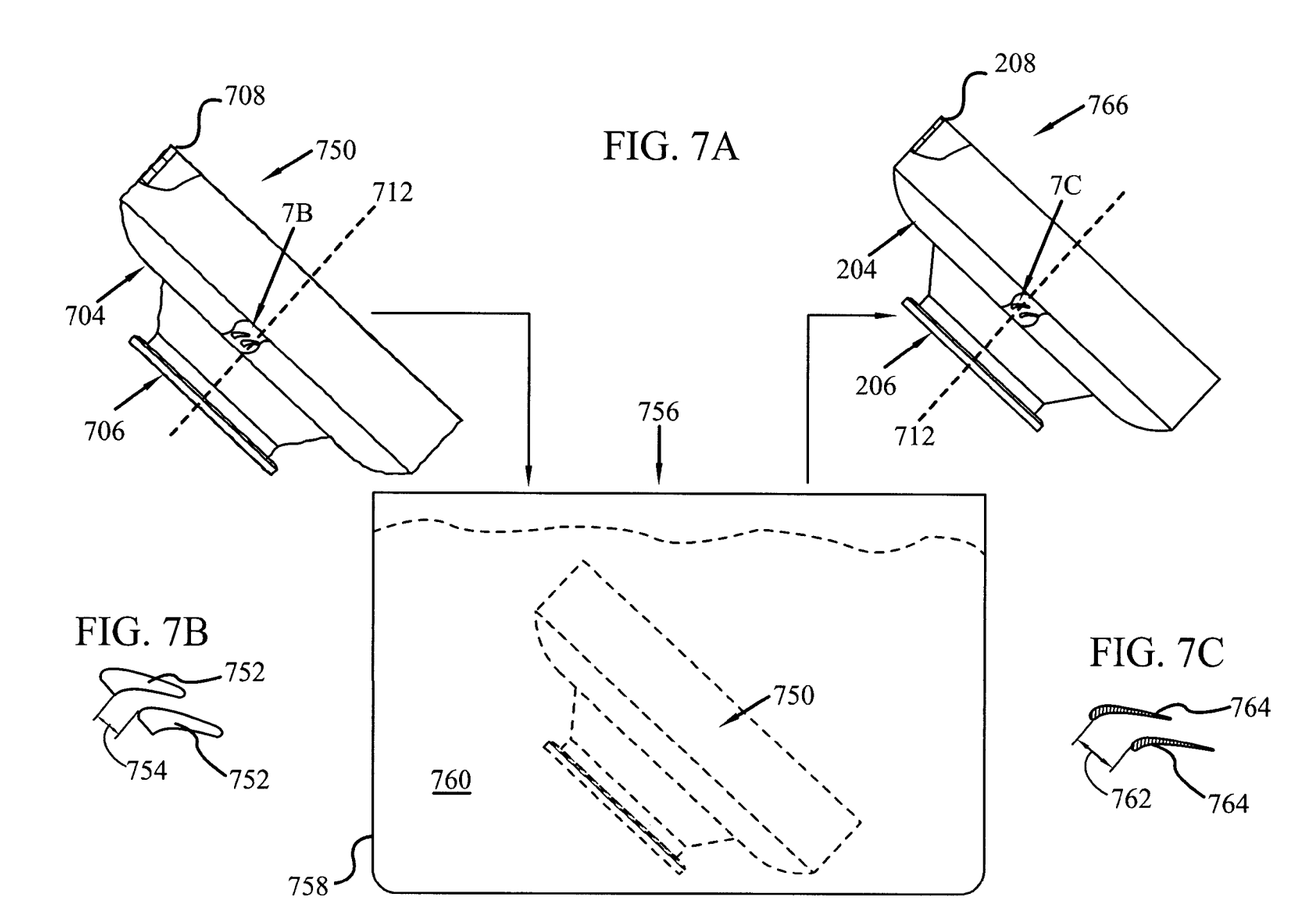
FIGS. 7A through 7C illustrate the steps of making the unitary inlet structure as shown in FIGS. 3A and 3B.

Having described the individual components of the unitary inlet structure 200, a preferred method of fabricating a titanium unitary inlet structure 200 will now be described as is illustrated in FIG. 7. It will be appreciated that the described method need not be performed in the order in which it is herein described, but that this description is merely exemplary of one preferred method of fabricating a titanium unitary inlet structure 200 in accordance with the present invention.

In at least one embodiment, fabrication involving casting may be used. With the use of casting there is no requirement that the stator 216, and more specifically the stator fins 304 be separately manufactured, arranged and joined by an appropriate process. Casting advantageously permits the outer housing 204 and internal stator 216 to be formed of substantially the same alloy and at substantially the same time.

As noted above, prior attempts to achieve a titanium unitary inlet structure 200 have been unsuccessful. To surmount this obstacle, in at least one embodiment an oversized annular housing 704 having a longitudinal centerline 712 is cast. The oversized housing defines an air inlet 706, a mounting surface 708 and a flow path therebetween. Inside the housing 704 is integrally cast an oversized stator between the air inlet 706 and mounting surface 708, substantially transverse to and concentric with the longitudinal centerline 712.

The internal cast stator is further characterized by a central circular body with a plurality of angularly spaced circumferentially mounted oversized stator fins 752 connecting the stator to the housing 704. In at least one embodiment the titanium alloy used in the casting is commonly known and identified as Ti6Al4V. In at least one embodiment the angular spacing of the stator fins may be symmetrical. In at least one alternative embodiment the angular spacing of the stator fins may be asymmetrical, as described above.

It is understood and appreciated that as used herein, the term oversized refers to casting the unitary inlet structure 750 with excess thicknesses relative to the design specifications. It is to be further understood and appreciated that substantially all of the components are uniformly oversized. For example, if the cast stator fins 752 are oversized by about 2 millimeters in thickness, then so too is the cast housing 704 oversized by about 2 millimeters in thickness. As shown in FIG. 7A the clearance 754 between the freshly cast stator fins 752 may be small, and below design specifications.

To remove the additional alloy from the oversized surfaces, the cast oversized unitary inlet structure 750 are placed in a chemical bath 756. More specifically the oversized unitary inlet structure 750 may be suspended in a milling tank 758 containing an appropriate chemical milling solution 760 for the titanium alloy used in the casting. Under appropriate circumstances it may be desired to pre-clean the oversized unitary inlet structure 750 to remove foreign materials such as oil, etc. Generally speaking, agitation of the milling solution 760 may occur during the chemical milling process to improve exposure of the surfaces to the milling solution 760 as well as to maintain a balanced concentration of the milling solution 760 throughout the tank 758.

The duration of the chemical milling process may be determined by calculating the rate of alloy removal for the chemical milling agent employed. Due to the precise clearance between the stator fins set forth in the design specifications, it may be desirable to calculate a first duration sufficient to remove substantially about 50 to 90 percent of the oversizing alloy. Upon removal from the chemical bath 756, the technician may measure the clearance 762 between the chemically milled stator fins 764 of the chemically milled unitary inlet structure 766 and compare the measured clearances to the design specifications providing one or more predetermined values.

From the measured clearance, the rate of removal may be recalculated and used to determine the duration for a repeat of the chemical milling process, if necessary, sufficient to provide clearance between the stator fins within design specifications. In at least one embodiment, the process of chemical milling may be repeated three times, the first removing substantially about 50% of the oversizing alloy, the second removing about 90% of the remaining oversizing alloy, and the third removing substantially all of the remaining oversizing alloy to provide clearance 764 within design specifications. Moreover, the stator fins are chemically milled until at least the measured clearance between the chemically milled stator fins is substantially equal to one or more of the predetermined values set forth in the design specifications.

It is understood and appreciated that the components of the chemically milled unitary inlet structure 766 are substantially identical to the above identified and discussed components of the unitary inlet structure 200. Under appropriate circumstances, additional tooling may be performed upon chemically milled unitary inlet structure 766, such as to further define the flanged skirt 312 and/or threaded sockets 300.

Chemical milling of the cast titanium unitary inlet structure permits the fabrication technician to achieve the required airfoil contours of the stator fins without requiring separate manufacture and installation. Reducing manufacturing time and costs, such single piece casting also aids in producing substantially identical titanium components resulting in more consistent and predictable turbine starter 100 performance. Maintenance upon the titanium unitary inlet structure is also substantially reduced as it is generally not possible for the components to separate. Reductions in manufacturing costs may also permit a damaged stator and inlet to simply be recycled rather than re-manufactured.

While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

We claim:

1. An air turbine starter comprising:
   a main housing;
   a turbine assembly partially disposed within the main housing, the turbine assembly including a turbine wheel having a plurality of blades circumferentially mounted thereon; and
   a unitary inlet structure coupled to the main housing and substantially enclosing at least a portion of the turbine wheel, the unitary inlet structure including:
      a housing section having at least an inlet, an inner surface, and a mounting surface, the mounting surface coupled to the main housing; and
      a stator section integrally formed as part of the housing section, the stator section disposed at least partially within the housing section and having an outer surface,
      wherein at least a portion of the housing section inner surface and at least a portion of the stator section outer surface form a flow path that fluidly couples the housing section air inlet to the turbine blades.

2. The air turbine starter of claim 1, wherein the unitary inlet structure is manufactured from a titanium alloy.

3. The air turbine starter of claim 1, wherein the unitary inlet structure coupled to the main housing defines a flow path from the air inlet, through the stator, through the blades of the turbine wheel, and to the outlet vent.

4. The air turbine starter of claim 1, wherein the stator is characterized by a central circular body with a plurality of angularly spaced circumferentially mounted stator fins.

5. The air turbine starter of claim 4, wherein each stator fin presents an angle of attack of about 36.738 degrees.

6. The air turbine starter of claim 4, wherein the angular spacing of the stator fins is symmetrical.

7. The air turbine starter of claim 1, wherein the stator is characterized by a central circular body with a plurality of asymmetrically angularly spaced circumferentially mounted stator fins.

8. The air turbine starter of claim 7, wherein the stator fins are subdivided into at least three groups;
   a first group substantially equally angularly spaced for about the total number of stator fins plus at least one, the spaced arrangement forming a first arc having a first and second end;
   a second group substantially equally angularly spaced for about the total number of stator fins minus at least one, the spaced arrangement forming a second arc having a first and second end; and
   a transition group characterized by an even number of stator fins substantially equally angularly spaced for about the total number of stator fins;
   wherein one half of the transition group is placed between the second end of the first arc and the first end of the second arc, and the second half of the transition group is placed between the second end of the second arc and the first end of the first arc, thereby joining the first and second arcs to substantially form a circle.

9. The air turbine starter of claim 7, wherein the stator is comprised of 29 stator fins.

10. The air turbine starter of claim 9, wherein the angular spacing of stator fins 1 through 14 is based on substantially equivalent spacing for about 30 stator fins, the angular spacing of fin 15 is based on spacing for about 29 fins, the angular spacing of stator fins 16 through 28 is based on substantially equivalent spacing for about 28 stator fins, and the angular spacing of fin 29 is based on spacing for about 29 fins.

11. An air turbine starter unitary inlet structure adapted to be coupled to a housing having a turbine assembly partially disposed therein, the turbine assembly including a turbine wheel having a plurality of blades circumferentially mounted thereon comprising:
   an annular housing having a longitudinal centerline, an air inlet, an inner surface, and a mounting surface; and
   an annular air director integrally formed as part of the annular housing, the air director disposed at least partially within the annular housing and having an outer surface that includes a center point in alignment with the longitudinal centerline and extending toward the air inlet,
   wherein at least a portion of the annular housing inner surface and the air director outer surface form a flow path that extends substantially parallel to the longitudinal centerline, and
   the unitary inlet structure is further adapted to substantially enclose at least a portion of the turbine wheel.

12. The unitary inlet structure of claim 11, wherein the annular air director is substantially concentric to the longitudinal centerline.

13. The unitary inlet structure of claim 11, wherein the annular air director is a stator characterized by a central circular body with a plurality of angularly spaced circumferentially mounted stator fins.

14. The unitary inlet structure of claim 13, wherein the spacing of the stator fins is symmetric.

15. The unitary inlet structure of claim 13, wherein the spacing of the stator fins is asymmetric.

16. The unitary inlet structure of claim 11, manufactured from a titanium alloy.

17. An air turbine starter unitary inlet structure comprising:
   a housing having a longitudinal centerline, an air inlet, an inner surface, a mounting surface, the annular housing defining a flow path between the air inlet and the mounting surface; and
   a stator integrally formed as part of the housing, the stator disposed at least partially within the housing between the inlet and mounting surface and substantially transverse to the longitudinal centerline.
   wherein the entire unitary inlet structure, including the stator, is manufactured from a titanium alloy.

18. The unitary inlet structure of claim 17, wherein the stator is characterized by a central circular body with a plurality of angularly spaced circumferentially mounted stator fins.

19. The unitary inlet structure of claim 18, wherein each stator fin presents an angle of attack of about 36.738 degrees.

20. The unitary inlet structure of claim 18, wherein the angular spacing of the stator fins is symmetrical.

21. The unitary inlet structure of claim 17, wherein the mounting surface further comprises at least one attacher.

22. The unitary inlet structure of claim 21, wherein the at least one attacher is a threaded screw socket.

23. A titanium air turbine starter unitary inlet structure comprising:
   a housing having a longitudinal centerline, an air inlet, an inner surface, a mounting surface, the annular housing defining a flow path between the air inlet and the mounting surface; and
   a stator integrally formed as part of the housing, the stator disposed at least partially within the housing between the inlet and mounting surface and substantially transverse to the longitudinal centerline,
   wherein the stator is characterized by a central circular body with a plurality of asymmetrically angularly spaced circumferentially mounted stator fins that are subdivided into at least three groups;
      a first group substantially equally angularly spaced for about the total number of stator fins plus at least one, the spaced arrangement forming a first arc having a first and second end;
      a second group substantially equally angularly spaced for about the total number of stator fins minus at least one, the spaced arrangement forming a second arc having a first and second end; and
      a transition group characterized by an even number of stator fins substantially equally angularly spaced for about the total number of stator fins;
      wherein one half of the transition group is placed between the second end of the first arc and the first end of the second arc, and the second half of the transition group is placed between the second end of the second arc and the first end of the first arc, thereby joining the first and second arcs to substantially form a circle.

24. The unitary inlet structure of claim 23, wherein the stator is comprised of 29 stator fins.

25. The unitary inlet structure of claim 24, wherein the angular spacing of stator fins 1 through 14 is based on substantially equivalent spacing for about 30 stator fins, the angular spacing of fin 15 is based on spacing for about 29 fins, the angular spacing of stator fins 16 through 28 is based on substantially equivalent spacing for about 28 stator fins, and the angular spacing of fin 29 is based on spacing for about 29 fins.

26. The unitary inlet structure of claim 24, wherein the angular spacing of stator fins 1 through 14 is about 12.0000 degrees, the angular spacing of stator fin 15 is about 12.4286 degrees, the angular spacing of stator fins 16 through 28 is about 12.8571 degrees, and the angular spacing of stator fin 29 is about 12.4286 degrees.

27. A method of manufacturing a titanium air turbine starter unitary inlet structure comprising:
   casting a unitary inlet structure from an alloy, the unitary inlet structure including:
      an oversized annular housing having a longitudinal centerline, at least an air inlet and a mounting surface, and
      an oversized stator integrally formed as part of the oversized annular housing, the oversized stator disposed at least partially within the housing and having a plurality of angularly spaced, circumferentially mounted oversized stator fins connecting the stator to the annular housing;
   chemically milling the oversized housing and stator to remove alloy from the oversized surfaces thereof;
   measuring the clearance between the chemically milled stator fins and comparing the measurements to one or more predetermined values;
   repeating the chemical milling and measuring steps until at least the measured clearance between the chemically milled stator fins is substantially equal to one or more predetermined values.

28. The method of claim 27, wherein the stator is transverse to and concentric with the longitudinal centerline.

29. The method of claim 27, wherein the alloy is a Ti6Al4V.

30. The method of claim 27, wherein the angular spacing of the stator fins is symmetrical.

31. The method of claim 27, wherein the angular spacing of the stator fins is asymmetrical.

* * * * *